Oct. 18, 1949.  T. W. FASSETT  2,484,939
WHEELED VEHICLE FOR CHILDREN
Filed Oct. 2, 1946  4 Sheets-Sheet 2

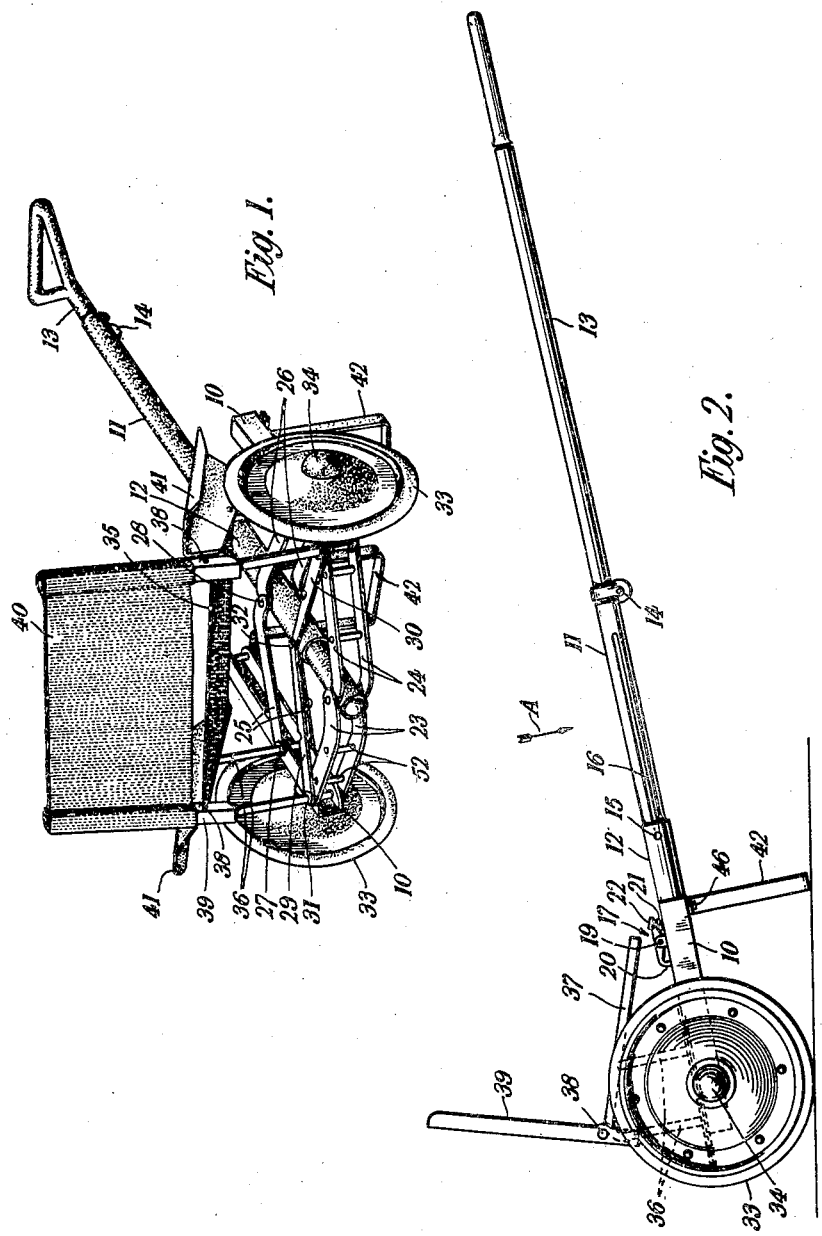

INVENTOR
T. W. Fassett.
By Watson, Cole, Grindle & Watson

Oct. 18, 1949.  T. W. FASSETT  2,484,939
WHEELED VEHICLE FOR CHILDREN
Filed Oct. 2, 1946  4 Sheets-Sheet 3
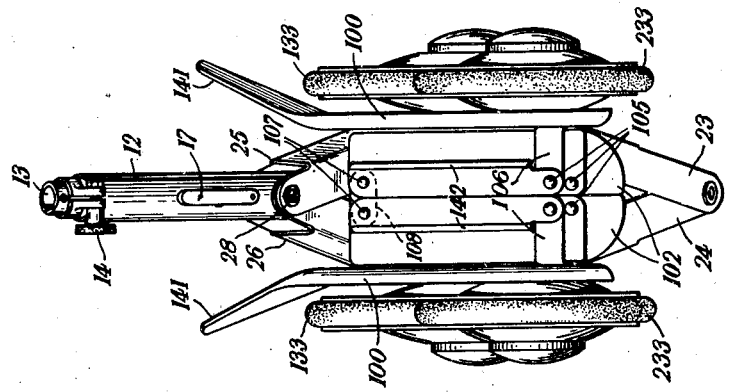
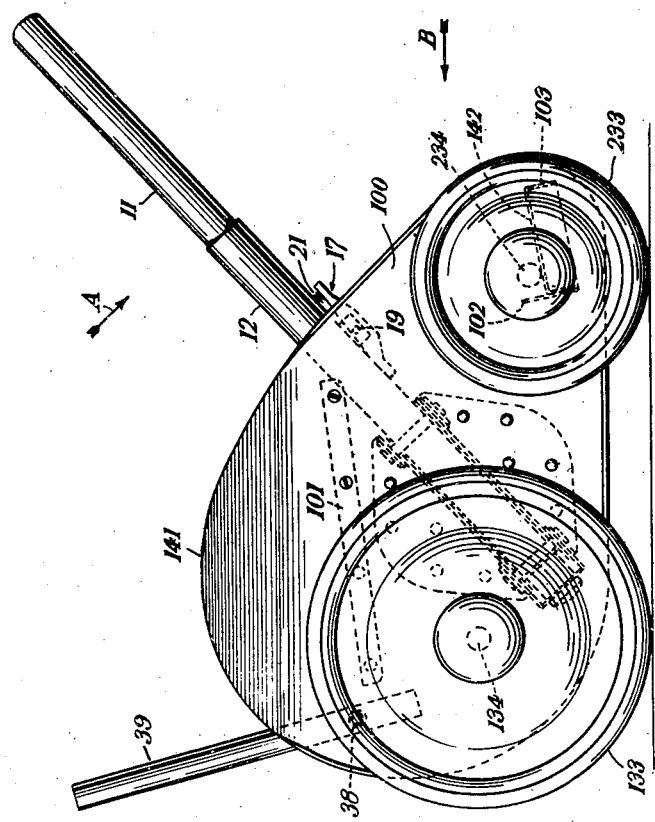
Inventor
T. W. Fassett
By Watson, Cole, Grindle + Watson Oct. 18, 1949.　　　T. W. FASSETT　　　2,484,939
WHEELED VEHICLE FOR CHILDREN
Filed Oct. 2, 1946　　　4 Sheets-Sheet 4
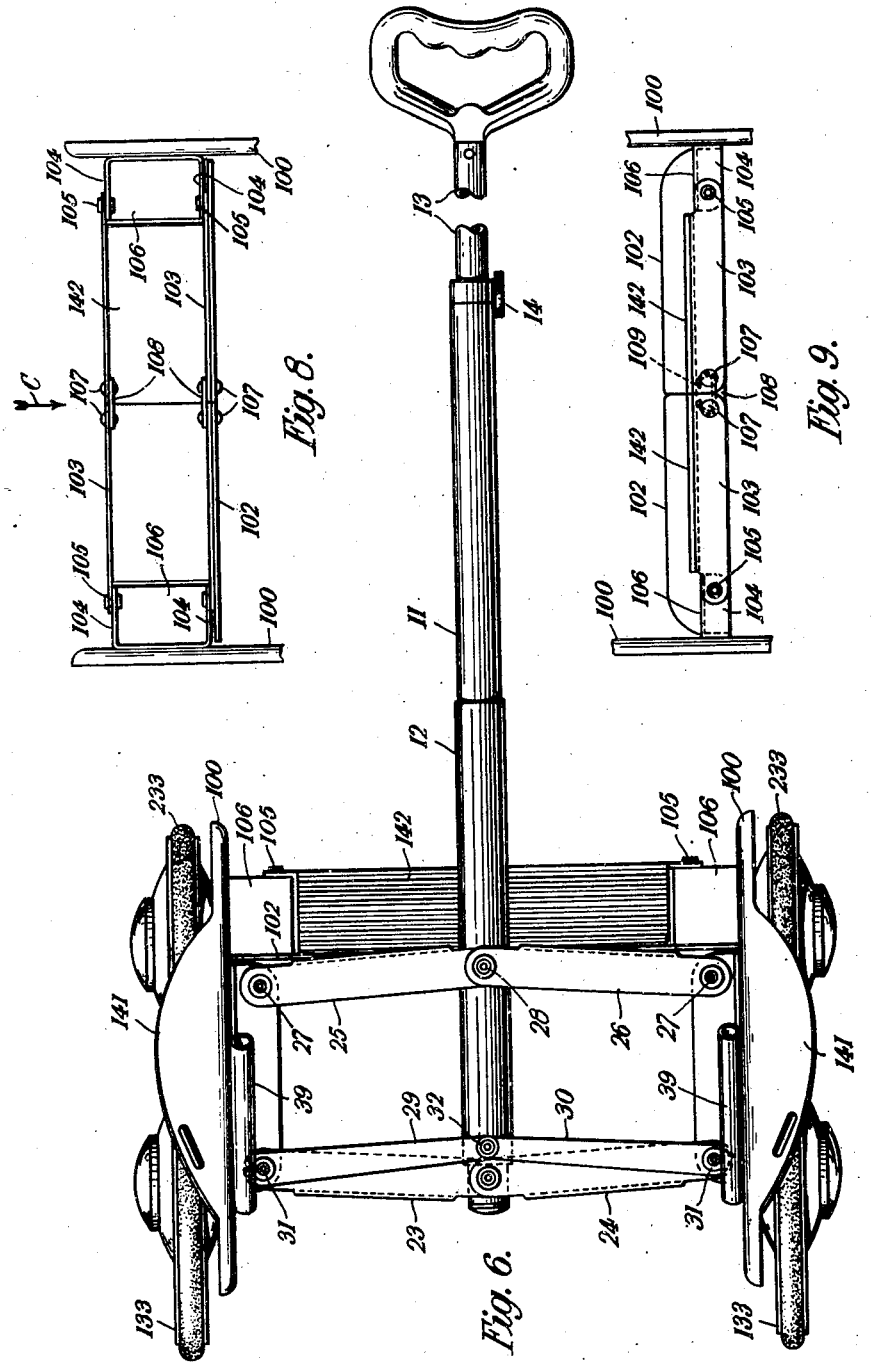
Inventor
T. W. Fassett
By Watson, Cole, Grindle & Watson Patented Oct. 18, 1949

2,484,939

UNITED STATES PATENT OFFICE 2,484,939

WHEELED VEHICLE FOR CHILDREN

Thomas William Fassett, Hayes, England, assignor to Alltoys Limited, Brentford, Middlesex, England Application October 2, 1946, Serial No. 700,640
In Great Britain November 22, 1945

13 Claims. (Cl. 280—42)

This invention has for its object to provide a wheeled vehicle for children, provided with a central towing bar by which the vehicle can be towed or pushed, and which is collapsible against the towing bar into a small compass so as to be readily portable when not required for use.

The wheeled vehicle according to the invention comprises a pair of side members each carrying a wheel supported thereon by a stub axle, a flexible seat extending between the side members, a flexible back rest supported by the side members, a pair of foot rests hinged at their outer ends to the side members, a central towing bar, a sleeve on the towing bar, a system of pivoted links between the sleeve and towing bar and the side members, the sleeve being slidable on the towing bar to alternative end positions in one of which the link system maintains the side members in spaced relation to hold the seat and foot rest extended, and in the other of which the side members are collapsed against the towing bar and the seat and foot rests folded, and means for latching the sleeve in its first mentioned end position.

The towing bar may conveniently be constituted by a metal tube, and the sleeve, side members and link system may also be of metal. These parts are preferably made of a light metal alloy.

Figure 3:
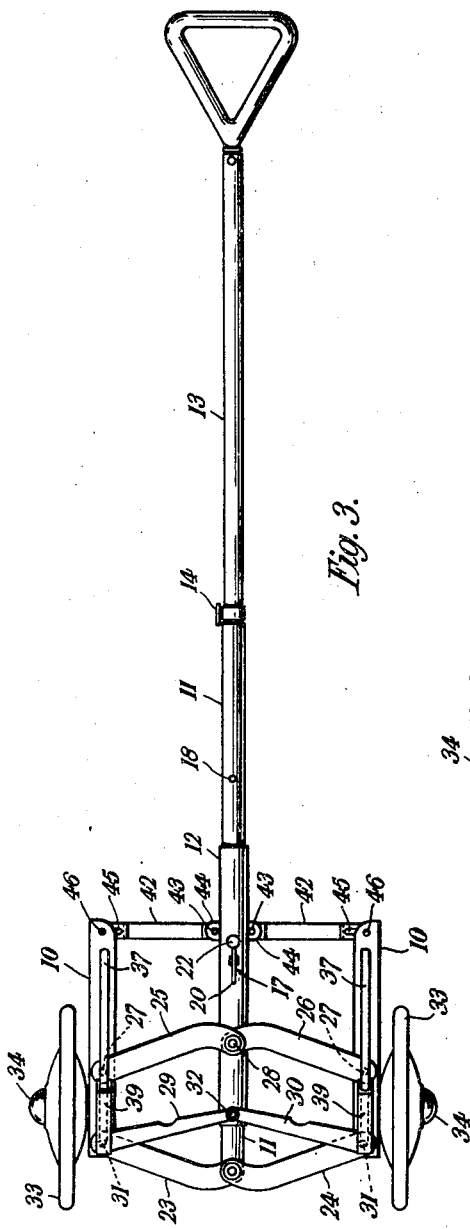
Figure 4:
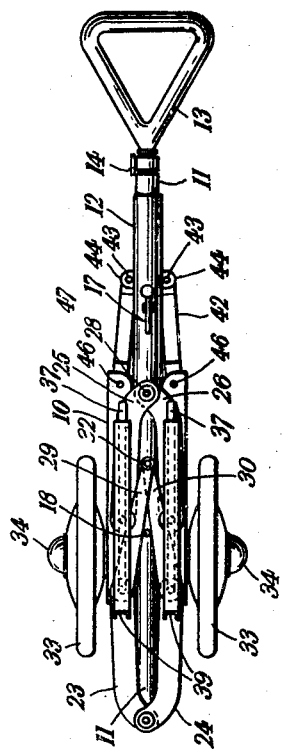

Two preferred forms of wheeled vehicle according to the invention will now be described, in detail, by way of example, with reference respectively to Figs. 1-4 or Figs. 5-9 of the accompanying drawings, in which:

Fig. 1 is a perspective view of the first form of vehicle as ready for use,

Fig. 2 is a side elevation of the skeleton structure of the vehicle, likewise as ready for use, Fig. 3 is a plan view of the skeleton structure looking in the direction of the arrow A in Fig. 2, Fig. 4 is a view similar to Fig. 3, but showing the skeleton structure collapsed against the towing bar, Fig. 5 is a side elevation of the second form of vehicle, Fig. 6 is a view looking in the direction of arrow A in Fig. 5 showing the vehicle extended, Fig. 7 is a view looking in the direction of arrow B in Fig. 5, showing the vehicle collapsed, Fig. 8 is a bottom plan view of the foot rest when expanded, and Fig. 9 is a view looking in the direction of arrow C in Fig. 8.

In Figs. 5-9 the flexible seat and back rest are omitted.

Like reference characters indicate like parts throughout the figures.

The vehicle shown in Figs. 1-4 comprises a carriage supported by a collapsible wheel-carrying skeleton structure. This skeleton structure comprises a pair of metal members 10 of channel form, a tubular metal towing bar 11, a slide constituted by a metal sleeve 12 slidably mounted on the towing bar and a system of metal links, described in detail below, connecting the side members to the sleeve and towing bar.

A handle 13 is fitted to the towing bar 11 and can be slid into and out of the towing bar, between extreme positions shown respectively in Figs. 1 and 4 and in Figs. 2 and 3, to vary the effective length of the towing bar to suit the height of the person in charge of the vehicle. Adjustment of the handle is effected by slackening a clamping screw 14 and afterwards tightening the screw to hold the handle in the new position.

The sleeve 12 is slidable along the towing bar 11 between an end position shown in Figs. 1-3, in which the skeleton structure is extended, and an end position shown in Fig. 4, in which the skeleton structure is collapsed. The sleeve 12 carries an inwardly projecting pin 15 (Fig. 2) engaging an axial slot 16 in the towing bar so that the sleeve cannot turn in relation to the bar. The sleeve can be locked in its two extreme positions by engagement of a latch 17 with one or other of a pair of holes 18 in the bar. These holes are shown in Figs. 3 and 4. The latch 17 is pivoted at 19 to the sleeve 12 and has an inwardly projecting nose 20 which passes through a hole in the sleeve 12 to engage the hole 18 in the bar 11. A spring 21 holds the nose 20 in the selected hole 18 in the towing bar, but finger pressure on the end 22 of the latch will free it and permit the sleeve to be slid into its alternative position. The axial slot 16 in the towing bar is of length equal to the length of travel of the sleeve and serves, by cooperation with the pin 15 on the sleeve, to define the two end positions, thus ensuring that when the finger pressure is released, the latch will snap into position to lock the sleeve 12 to the towing bar 11.

The link system above referred to comprises an outer pair of double links 23, 24 connecting the outer end of each side channel 10 (i. e. the end remote from the handle) with the outer end of the towing bar 11, an inner pair of double links 25, 26 connecting points 27 intermediate in the length of the channels 10 with a common point 28 on the sleeve 12, and a pair of stabilising links 29, 30. The stabilising links are pivoted at one end on the pivots 31 by which the double links 23, 24 are attached to the channels 10, and at the other ends to a common pivot point 32 at the outer end of the sleeve 12.

Each double link (see for example 23) is constituted by a pair of companion superposed spaced links extending in parallel between common pivots, and the outer double links 23, 24, are connected together by rods 52. The duplication of the links 23, 24, 25, 26 ensures that the skeleton structure will take the load due to the weight of the occupant of the carriage. The stabilising links 29, 30, which are spaced from and approximately parallel to the inner double links 25, 26, ensure parallelism of the channels 10. It will be noted, from a comparison of Figs. 3 and 4, that the link system is effective, according to the position of the sleeve 12 in relation to the towing bar 11, either to hold the channels 10 in spaced relation or to collapse them against the towing bar.

The skeleton structure includes a pair of wheels 33, supported one on each of the channels 10 by a stub axle 34, and an upstanding bracket on each channel. Each bracket is constituted by a tubular frame structure consisting of uprights 36 and a top member 37. To each such structure is pivoted at 38 a channel section post 39. U-shaped foot rests 42 are provided between the inner ends of the channels 10 and the sleeve 12. The foot rests are pivoted at 43 to a bracket 44 fixed to the sleeve and have, at their other ends, slots 45 engaging pins 46 fixed to the channels 10.

To the skeleton structure shown in Figs. 2–4 are fitted certain other parts shown only in Fig. 1. These comprise a seat, constituted by a band 35 of canvas or other flexible material attached to the members 37 of the brackets, a back-rest constituted by a band 40 of canvas or other flexible material attached to the posts 39, and a pair of sheet metal arm rests 41 fixed one to each of the brackets. The back-rest can of course be folded down towards the seat when it is desired to collapse the vehicle. A comparison of Figs. 3 and 4 will show how the linkage system folds up to permit the side channels 10 to collapse against the towing bar.

When extended, the vehicle is a stable structure which can readily support the weight of a child and be pushed or towed along on its wheels. When collapsed, the vehicle can be readily carried and transported through narrow openings, such as those of railway carriage doors. In its collapsed condition it is sufficiently compact for easy stowage, e. g. on a luggage rack in a railway carriage.

The vehicle shown in Figs. 5–9 is similar in essentials to that shown in Figs. 1–4. There are two differences, however, viz.—

(1) The side members in this case are constituted by sheet metal plates 100, each supporting two wheels 133, 233 carried on stub axes 134, 234 respectively. As shown, each of these side plates 100 replaces the corresponding side channel 10 and tubular frame structure 36, 37 of Figs. 1–4, and the upper edge of each side plate 100 is turned over to form an arm rest 141. The flexible seat is supported by members 101 secured to the inner faces of the plates 100 and, as before, the back rest is supported by posts 39 pivoted at 38 to the side members.

(2) The foot rests, in the case of the arrangement shown in Figs. 5–9 are constituted by flat metal plates 142, each of which has at its outer end an upturned flange 102 for supporting the heels of the occupant. Each plate 142, as shown in Fig. 8, has a pair of downwardly depending flanges 103. At one end, the flanges 103 of each plate are hinged, by pins 105, to downwardly depending flanges 104 of brackets 106 secured to the inner faces of the side members 100. The adjacent ends of the flanges 103 of the two plates are united by hinge pins 107 to links 108. It will be observed that the hinge pins 105, 107 extend parallel to the axis of the towing bar 11 and that, in the extended position of the vehicle, the foot rests form a more or less flat bridge as shown in Figs. 6 and 8. When however the side members are collapsed against the towing bar, the plates 142 fold upwardly about the hinge pins 107 as shown in Fig. 7.

A spring 109, Fig. 9, is provided for holding, when the vehicle is extended, the adjacent ends of the plates 142 slightly above the level of the ends secured to the side members, so ensuring that the central hinge pins 107 will be above dead centre in relation to the pivot pins 105, which is necessary to ensure that the foot rests will not resist inward movement of the side members towards the towing bar when it is sought to collapse the vehicle. Pressure of the feet against the plates 142 will however cause them to lie truly flat when the vehicle is in use and occupied by a child.

What I claim as my invention and desire to secure by Letters Patent is:

1. A wheeled vehicle for children, comprising a pair of side members each carrying a wheel supported thereon by a stub axle, a flexible seat extending between the side members, a flexible back rest supported by the side members, a pair of foot rests hinged at their outer ends to the side members, a central towing bar, a sleeve on the towing bar, a system of pivoted links between the sleeve and towing bar and the side members, the sleeve being slidable on the towing bar to alternative end positions in one of which the link system maintains the side members in spaced relation to hold the seat and foot rests extended, and in the other of which the side members are collapsed against the towing bar and the seat and foot rests folded, and means for latching the sleeve in its first mentioned end position.

2. A vehicle as claimed in claim 1, in which the link system comprises a pair of links connecting the outer ends of the side members to the outer end of the towing bar and a further pair of links connecting points intermediate in the length of the side members to a common point on the sleeve.

3. A vehicle as claimed in claim 2, in which each pair of links is duplicated, each link of each pair having a companion link spaced from it and extending parallel to it, the link and companion link being attached at their ends to common pivots.

4. A vehicle as claimed in claim 3, in which the link system includes a pair of stabilising links extending from the outer ends of the side members to a common point at the outer end of the sleeve.

5. A wheeled vehicle for children, comprising a central towing bar, a pair of side members, each carrying at least one wheel supported thereon by a stub axle, a flexible seat extending between and supported by the side members, a sleeve mounted to slide on the towing bar, a pair of foot rests pivoted at their outer ends each to one of the side members, a system of pivoted links connecting the side members to the sleeve and to the towing bar and effective, in a first position of the sleeve in relation to the towing bar, to hold the side members in spaced relation with the seat and foot rests extended between them and, in a second position of the sleeve in relation to the towing bar, to hold the side members collapsed against the towing bar with the seat and foot rests folded, and a latch on the sleeve for engaging a recess in the towing bar to lock the sleeve in said first position in relation to the towing bar.

6. A vehicle as claimed in claim 5, in which the foot rests are of U form and are pivoted at their opposite ends to the side members and to the sleeve, and are arranged to fold against the sleeve, turning about the pivots securing them to the sleeve, as the side members are collapsed against the towing bar.

7. A vehicle as claimed in claim 5, in which the foot rests are constituted by flat metal plates which are hinged together and to the side members by hinges extending parallel to the axis of the towing bar, the foot rests forming a substantially flat bridge piece between the side members when the latter are extended and folding upwardly about the hinges securing them to the side members as the side members are collapsed, and comprising a spring for holding the adjacent ends of the plates slightly above the ends hinged to the side members when said side members are extended.

8. A vehicle as claimed in claim 5, comprising a pair of uprights supported by the side members at the ends thereof remote from the towing bar, and a flexible back rest extending between said uprights, said uprights being pivoted to said side members, so as to allow the back rest to be folded against the seat.

9. A wheeled vehicle for children, comprising a central towing bar, a pair of side members, each carrying at least one wheel supported thereon by a stub axle, a flexible seat extending between and supported by the side members, a sleeve on the towing bar, a system of parallel links pivotally connected to the sleeve and to the side members, a pair of pivoted links connecting the side members to the towing bar, said sleeve being slidable on said towing bar to alternative end positions, in one of which said links hold the side members in spaced relation with the seat extended and in the other of which said side members are collapsed against the sleeve with the seat folded, and means for latching the sleeve in its first-mentioned end position.

10. A wheeled vehicle for children, comprising a central towing bar, a pair of side members, each carrying at least one wheel supported thereon by a stub axle, a flexible seat extending between and supported by the side members, a sleeve mounted to slide on the towing bar, a system of pivoted links connecting the side members to the sleeve and to the towing bar and effective, in a first position of the sleeve in relation to the towing bar, to hold the side members in spaced relation with the seat extended between them, and, in a second position of the sleeve in relation to the towing bar, to hold the side members collapsed against the towing bar with the seat folded, and a manually releasable latch on the side operative to engage automatically, on arrival of the sleeve at either of its said positions, a recess in the towing bar so as to lock the sleeve to the towing bar.

11. A wheeled vehicle as claimed in claim 10, in which the towing bar is constituted by a tube and the latch is loaded by a spring so that it will automatically spring into engagement with a hole in the tube, when the sleeve is moved to either of said positions, and thereby lock the sleeve to the tube.

12. A wheeled vehicle for children, comprising a pair of side members each supporting at least one wheel, a flexible seat extending between and supported by the side members, a pair of footrests hinged at their outer ends to the side members, a central towing bar, a sleeve on the towing bar, a system of pivoted links between the sleeve and the towing bar and the side members, the sleeve being slidable on the towing bar to alternative end positions in one of which the link system maintains the side members in spaced relation to hold the seat and foot-rests extended, and in the other of which the side members are collapsed towards the towing bar and the seat and footrests folded, and means for latching the sleeve in its first mentioned end position.

13. A vehicle as claimed in claim 20, in which the footrests are constituted by flat plates which are hinged together and to the side members by hinges extending parallel to the axis of the towing bar, the foot-rests forming a substantially flat bridge piece between the side members when the latter are in spaced relation and folding upwardly about the hinges securing them to the side members as the side members are collapsed, and comprising means for holding the adjacent ends of the plates slightly above the ends hinged to the side members when said members are in spaced relation.

THOMAS WILLIAM FASSETT.

REFERENCES CITED

The following references are of record in the file of this patent:

UNITED STATES PATENTS

| Number | Name | Date |
| --- | --- | --- |
| 168,647 | Krueger | Oct. 11, 1875 |
| 699,186 | Katzke | May 6, 1902 |
| 1,110,162 | Taylor | Sept. 8, 1914 |
| 2,228,046 | Bird | Jan. 7, 1941 |
| 2,380,016 | Black | July 10, 1945 |

Certificate of Correction

Patent No. 2,484,939                                          October 18, 1949

THOMAS WILLIAM FASSETT

It is hereby certified that error appears in the printed specification of the above numbered patent requiring correction as follows:

Column 6, line 39, for the claim reference numeral "20" read *12*;

and that the said Letters Patent should be read as corrected above, so that the same may conform to the record of the case in the Patent Office.

Signed and sealed this 3rd day of October, A. D. 1950.

[SEAL]

THOMAS F. MURPHY,
*Assistant Commissioner of Patents.*